United States Patent [19]

Meister

[11] 4,119,323
[45] Oct. 10, 1978

[54] HEAT AND SOLVENT RESISTANT FLEXIBLE GASKET MEANS AND PROCESS FOR PRODUCTION THEREOF

[75] Inventor: Herbert Meister, Langnau a.A., Switzerland

[73] Assignee: Herbert Meister and Co., Zurich, Switzerland

[21] Appl. No.: 798,167

[22] Filed: May 18, 1977

[30] Foreign Application Priority Data

May 18, 1976 [CH] Switzerland .................. 6222/76

[51] Int. Cl.² ............................................. F16J 15/22
[52] U.S. Cl. ............................................ 277/235 R
[58] Field of Search ................. 277/227, 233, 235 B, 277/229, 230, 235 R

[56] References Cited

U.S. PATENT DOCUMENTS

| | | | |
|---|---|---|---|
| 2,902,305 | 9/1959 | Poltorak | 277/235 |
| 3,361,432 | 1/1968 | Usher | 277/235 |
| 3,406,979 | 10/1968 | Weber | 277/235 |
| 3,481,824 | 12/1969 | Poltorak | 277/235 |
| 3,502,784 | 3/1970 | Kunkel | 277/235 |
| 3,542,375 | 11/1970 | Renwick | 277/235 |
| 3,781,021 | 12/1973 | Thomson | 277/235 |

*Primary Examiner*—Robert I. Smith
*Attorney, Agent, or Firm*—Omri M. Behr

[57] ABSTRACT

There is provided a novel form of heat and solvent resistant gasket means available in strip and, where desired, ring form comprising a compacted fibrous core surrounded by a flexible metallic winding, said winding being further surrounded by fibrous heat resistant material impregnated with heat and solvent resistant polymer to provide a smooth outer surface for said gasket means. The gasket means may optionally further include a central metallic core within the fibrous core and also include a second flexible metallic winding substantially coaxial with said first metallic winding.

14 Claims, 5 Drawing Figures

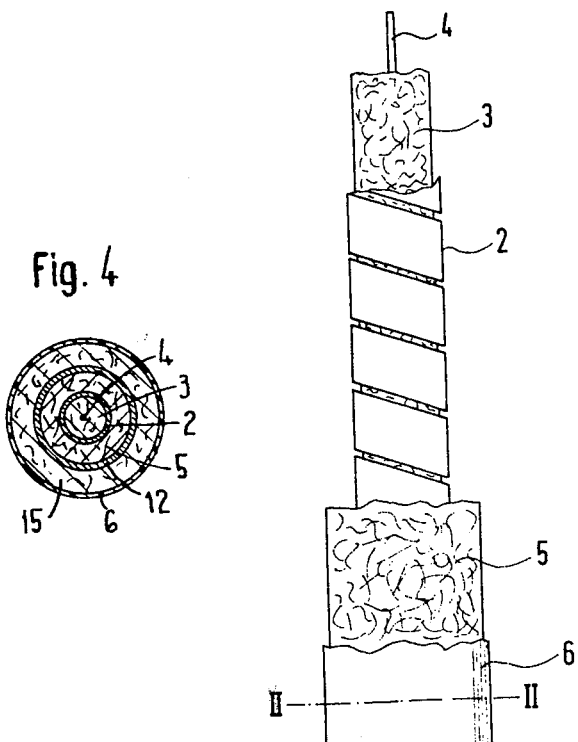
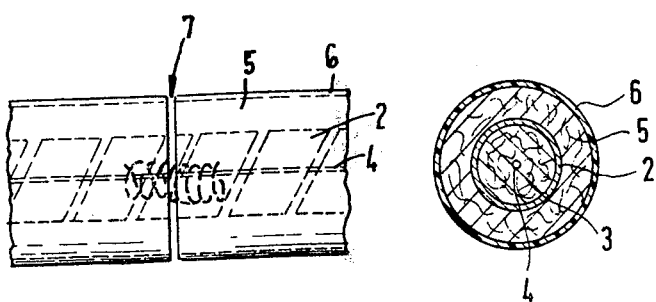
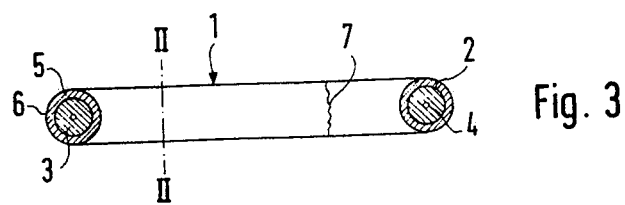

HEAT AND SOLVENT RESISTANT FLEXIBLE GASKET MEANS AND PROCESS FOR PRODUCTION THEREOF

BACKGROUND OF THE INVENTION

Where, in a machine, it is necessary to join two portions thereof in order to prevent the pasage through said joints of a fluid or gaseous medium, the mode of sealing will depend on whether the two parts of the machine move in relationship to each other or are static in relationship to each other once the machine is assembled. Where the machine parts move relative to each other, for example, in an automobile piston moving in an automobile cylinder, the sealing problem is designated as dynamic sealing. On the other hand, where, in a similar machine, the cylinder head is connected to connected to the cylinder block, the two parts do not move relative to each other and the sealing is designated as static sealing. It is with this latter form of sealing that the present invention is concerned. In most, although not all, modes of static sealing, there are utilized gasket means which are substantially annular in plan view and have a predetermined generally, but not exlusively, circular cross section. A prime example of this type of gasket means is the "O" ring. Such gasket means are employed in the sealing of flanges, lids, stoppers, screws, and the like.

For static sealing, one may also employ substantially flat gasket means as, for example, the gasket means employed between the head and the block of an automobile cylinder. While these means are available for the provision of sealing against higher pressures, they employ substantially harder and less elastic sealing materials, and require a high initial stressing force which necessarily leads to greater expenses.

On the other hand, where O-rings are used, in so far as they are sufficiently elastic, only minimal initial stressing forces are required, and they automatically form themselves into a sealing pattern. The advantage of the O-ring type of sealing means is that as the pressure in the contained volume rises, the gaseous or fluid medium pressing on the exposed surface of the O-ring automatically transfers the pressure onto the working faces of the mutually abutting surfaces of the equipment. Since the sealing rings have, because of their nature, a radial or axial initial stress, the sealing force will always exceed the force exerted by the gaseous or liquid medium.

The O-rings utilized heretofore have usually been made of rubber or other elastomers of varying qualities and hardnesses which have, unfortunately, the common disadvantage that they have a relatively short working life. This working life is shortened by higher temperatures, particularly in the presence of air, which "age" the rubber or elastomer partly through oxidation and partly through further vulcanization. These two factors increase the hardness of the gasket means and, at the same time, reduce the elasticity and flexibility thereof leading, ultimately, to rupture. Elastomeric O-rings must, therefore, be periodically replaced. Where the sealing of dangerous media is concerned, for safety reasons, the replacement must be carried out at intervals which are so short that no problems of ageing in the gasket means can be allowed to have appeared.

Furthermore, there are certain circumstances under which the utilization of elastomeric gasket means is not permissable. These circumstances include, for example, very low temperatures — that is to say, below minus 60° C. — or very high temperatures — that is to say, above about 200° C. — in the presence of chemically active substances which attack the elastomeric material or, more recently, radioactive media.

It would therefore be desirable to provide a gasket sealing means for static sealing in strip or suitably ring form, the elasticity of which does not deteriorate through ageing, which is utilizable up to 500° C., and which is substantially unaffected by even strong radioactive radiation.

SUMMARY OF THE INVENTION

There is provided a gasket sealing means in strip or ring form, said strip or ring having a predetermined cross section, comprising a chemically and temperature resistant mass having imbedded therein a radial and/or axially spring elastic winding. There is further provided a process for the manufacture of such gasket means. The invention hereof comprises a preformed substantially heat and solvent resistant gasket sealing means of predetermined cross section comprising a core of compacted heat resistant fibrous material. In one embodiment of the invention, said core surrounds a metallic core embedded substantially axially therein. This central core is surrounded by a flexible, substantially helical, metallic winding and said winding itself is enveloped by a further envelope of compacted heat resistant fibrous material. Said envelope is impregnated with a heat and solvent resistant material, suitably a polymeric material, in sufficient quantity to bind the fibers into an unitary envelope and provide a substantially smooth outer surface upon said envelope. In a further embodiment of the invention, a predetermined length of the thus provided gasket means is joined together at its ends to provide an O-ring type gasket. In a preferred embodiment of this O-ring, a flexible spring is inserted substantially axially into each of the aforesaid ends prior to sealing said ends together whereby there is provided additional structural strength to the joint.

BRIEF DESCRIPTION OF THE DRAWINGS

FIG. 1 is a partially exploded plan view of one of the preferred embodiments of the present invention.

FIG. 2 is a cross sectional view of FIG. 1 viewed at 2—2.

FIG. 3 is a cross sectional view of a strip of FIG. 1 formed into an O-ring.

FIG. 4 is a cross sectional view of a further embodiment similar to the view of FIG. 2 comprising a device having two coaxial sheaths.

FIG. 5 is a cross sectional exploded view of the portion of the view of FIG. 3 at joint 7.

DESCRIPTION OF THE PREFERRED EMBODIMENT

The basic embodiment of the present invention comprises, as illustrated in FIG. 2, a central core of fibrous material 3, a flexible substantially helical metallic winding 2, surrounding said core, an outer envelope 5, also of heat resistant fibrous material, impregnated with a heat resistant polymeric material in a sufficient amount to provide a smooth envelope 6 surrounding the entire gasket sealing means.

In the preferred embodiment of the invention, the central core comprises heat resistant fibers. Such fibers may be asbestos, quartz, fiberglass, or the like, or they may be synthetic fibers — for example, polytetrafloréthylene, or the like.

The central core may comprise said fibers compressed into a column, woven into a string, or initially woven into fine strands, and said strands further woven into a woven core of substantially cylindrical cross section.

In one of the preferred embodiments of this invention, as illustrated in FIG. 1, there is provided a metallic core running substantially axially through the fiber core. This metallic core may be provided from any high melting metal. Steel, nickel chromium steel, or nickel itself is considered suitable; however, the invention is in no way limited thereto.

In a further preferred modification of the present invention, the metal core 4 is integrally bound to the surrounding fiber core 3.

Nothing herein should be considered as limiting the invention to the use of a single monomer. The use of co-monomers for the product of co-polymers is considered to be within the scope of the present invention.

As impregnating melt polymers there may be employed:

As impregnating in situ polymerization monomers there may be employed:

The polymerization conditions for said monomers and co-monomers are considered to be well known to those skilled in the art.

The fiber core 3 is then surrounded with a helical metallic winding 2. The metallic winding 2 is formed of flexible metal having spring qualities, suitably spring steel. The winding may be in the form of a helically wound strip as shown in FIG. 1 or in the form of a more conventional round, or substantially round, spring wire rather than a strip. It is also within the purview of the present invention that the winding may utilize the so-called coiled coil format generally encountered in incandescent lamps wherein a thin wire is tightly coiled upon itself to form a very flexible coil and this tightly wound coil is then helically wound around core 3 in the manner of strip 2.

Around the helical winding 3 there is provided a further layer of fibrous material 5. The same fibrous materials utilized in the formation of core 3 may be employed. It is not necessary, however, that the identical fiber be used for the provision of inner core 3 and outer covering 5. Said outer covering 5 is similarly impregnated with a heat and solvent resistant polymeric material in such a way as to provide a smooth envelope 6 surrounding the fibrous covering 5. This polymeric impregnate may be any of those utilized to impregnate the inner core 3 but need not necessarily be identical to the one utilized in the impregnating inner core 3. In a further embodiment of the invention, an intermediate metallic winding 12 is located coaxially with winding 2 imbedded in fibrous covering 5.

In one of the preferred embodiments of the present invention, the gasket means is provided in the form of an O-ring. Said O-ring comprises a predetermined length of the gasket means, the exposed ends whereof have been sealed together. In an especially preferred embodiment of said O-ring gasket, there is provided a spring means axially embedded in each end to provide a metallic bridge between the two ends of the original piece of gasket means material. In the process of preparing the gasket means of the present invention, the fibrous core 3 is, preferably, bound to the metallic core 4 by impregnating said fiber core with a suitable temperature resistant, substantially insoluble, polymeric material. Such impregnation may take place by passing the core through a melt of the polymer or by passing it through a mixture containing one or more monomers, and then subjecting the monomer saturated core to polymerization conditions which may be internal or external; thus, the core may be soaked in a monomer which polymerizes upon exposure to heat, air, moisture, radiation, or free radical sources.

The metallic winding 2 is then placed around the core 3. This may be achieved in one of two ways. In one approach there is preformed a helical winding 2 through which the core 3 is drawn. Where it is desired to produce substantial lengths of the gasket material, however, it is preferred to wind the helical spring 2 around the core material using spring winding equipment which is well known to those skilled in the art.

The outer covering 5 is then placed upon the metallic winding 2. While this may be done by drawing a preformed sleeve of previously woven fiber materials over the metallic winding, it is, again, generally preferred to weave or knit the fibrous material around the metallic winding in a manner well known in the art — in particularly, in the art of cable manufacture. It is especially preferred to utilize fibers which have previously been spun into fine thread to provide the smoothest possible coating of whatever thickness desired upon the metallic winding.

If desired, a second metallic winding 12 may then be placed upon covering 5 in a similar manner to that set forth above, and a further covering 15 also of fine spun fibrous material placed upon said second winding 12. The fibrous envelope 5, 15, or both, are then impregnated with a heat and solvent resistant polymer in the manner set forth above. In this case, however, it is desirable to provide a smooth outer surface in order to facilitate the sealing function of the product. This smooth envelope may be provided either by carrying out the polymerization or deposit the impregnation within a mold of predetermined cross section with respect to diameter and shape or, preferably, drawing the coated and impregnated product through one or more dyes of suitable size and shape. Where quantity production is in view, this latter mode is to be preferred.

While the present invention should in no way be considered as limited thereto or thereby, it has been found that for the provision of the winding 2 strips of string steel of 0.2 to 0.5 millimeters in width/thickness are to be preferred.

There are readily provided by the above identified procedures gasket sealing means having a cross sectional diameter of between 2.75 and 12 millimters (This refers, of course, to the sealing material itself and not to the "cross-O" diameter of annular O-rings which are also within the purview of the present invention).

The products of the present invention have an elasticity of the same order of magnitude as the elastomeric O-rings presently known in the art, but with the advantage that the O-rings (and other forms of said gasket sealing means, within the purview of the present invention) do not age and have a "in use" life of approximately twenty-five times that of the conventional elastomeric O-rings while, at the same time, being stable at temperatures up to 500° C. and are resistant to pressures of up to 25 atmospheres as well as to attack by oils, benzenes, oxygenated and unoxygenated hydrocarbons, acids, alkalis, and other chemically aggressive materials. The materials produced by the present invention are also resistant to high levels of radioactivity and, therefore, despite their substantially higher initial cost compared to the estomeric rings, are, because of their greater active life, especially to be recommended in the construction of atomic reactors.

Where there are utilized, in the outer envelope 5 or 15, quartz fibers in the form of windings or weavings, the products of the present invention are temperature resistant up to 1,500° C.

I claim:

1. A preformed substantially heat and solvent resistant gasket sealing means of predetermined cross section comprising:
    (a) a core of compacted heat resistant fibrous material;
    (b) a first, flexible, substantially helical, metallic winding surrounding said core; and,
    (c) an envelope of compacted heat resistant fibrous material surrounding said winding, said envelope being impregnated with a heat and solvent resistant material in sufficient quantity to physically bind said fibrous material into an unitary envelope and to provide a substantially smooth outer surface of predeterminable cross section on said envelope.

2. A means in accordance with claim 1 additionally comprising:
    a metallic core running substantially axially through said compacted fibrous core.

3. A means according to claim 2 wherein the metallic core and the compacted fibers are integrally bound together by means of a binding impregnate impregnated into said fibrous core.

4. A means according to claim 1 wherein the metallic winding comprises a metallic strip formed in a helix.

5. A means according to claim 4 wherein the metallic winding comprises a spring steel metal strip.

6. A means according to claim 1 wherein the metallic winding comprises metallic wire formed in a helix.

7. A means according to claim 6 wherein the metallic winding comprises a spring steel metal wire.

8. A means according to claim 1 wherein the metallic winding comprises helically coiled metallic wire helically wound around said fibrous core.

9. A means according to claim 1 wherein the core comprises fibers in the form of preformed string or fibers woven into substantially cylindrical form from a plurality of strands of said fiber.

10. A means according to claim 1 wherein the metallic winding is surrounded by a sheath of fibers in woven form.

11. A means according to claim 1 wherein the fibers are selected from the group consisting of asbestos, quartz and fiberglass.

12. A means according to claim 1 additionally comprising a second flexible helical metallic winding substantially coaxially surrounding said first winding, the space between said first and said second winding being substantially filled with compacted and heat resistant fibrous material.

13. A means according to claim 1 wherein the impregnating heat and solvent resistant material is selected from the group consisting of viton, polytetraflorethylene, silicone and combinations thereof.

14. A means of claim 1 comprising a segment of said means formed into an annular gasket of predetermined diameter.

* * * * *